United States Patent
Bock et al.

(10) Patent No.: US 6,840,570 B2
(45) Date of Patent: Jan. 11, 2005

(54) FLOOR ASSEMBLY FOR A DRIVER'S CAB AND METHOD OF MAKING

(75) Inventors: Hans-Peter Bock, Sindelfingen (DE); Herbert Fischer, Weil der Stadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/424,158

(22) Filed: Apr. 28, 2003

(65) Prior Publication Data

US 2003/0234557 A1 Dec. 25, 2003

(30) Foreign Application Priority Data

Apr. 27, 2002 (DE) .......................................... 102 18 926

(51) Int. Cl.⁷ .............................................. B62D 25/20
(52) U.S. Cl. ............................ 296/193.07; 296/187.08; 296/190.08
(58) Field of Search ....................... 296/193.07, 203.02, 296/187.08, 190.08

(56) References Cited

U.S. PATENT DOCUMENTS

| | | | | |
|---|---|---|---|---|
| 4,457,555 A | * | 7/1984 | Draper .................... | 296/181.4 |
| 4,572,571 A | * | 2/1986 | Malen ................... | 296/193.07 |
| 4,695,342 A | * | 9/1987 | Belleau et al. ............... | 156/173 |
| 4,836,600 A | * | 6/1989 | Miyazaki et al. ...... | 296/193.07 |
| 5,129,700 A | * | 7/1992 | Trevisan et al. ........ | 296/193.07 |
| 5,611,593 A | * | 3/1997 | Fukagawa et al. .......... | 296/204 |
| 5,882,065 A | * | 3/1999 | Koiwa et al. .......... | 296/203.02 |
| 6,666,501 B1 | * | 12/2003 | Logan et al. .......... | 296/193.07 |
| 6,679,546 B2 | * | 1/2004 | Mishima et al. ........ | 296/203.01 |

FOREIGN PATENT DOCUMENTS

| DE | 19802092 | 7/1999 |
|---|---|---|
| DE | 10045138 | 4/2002 |
| JP | 01047683 | 2/1989 |

* cited by examiner

Primary Examiner—Stephen Gordon
(74) Attorney, Agent, or Firm—Crowell & Moring LLP

(57) ABSTRACT

A floor assembly for a driver's cab of a commercial vehicle, has a tunnel section extending in the direction of travel of the vehicle and floor sections which extend, with regard to the direction of travel, next to the tunnel section and are fastened laterally to the tunnel section. In order to simplify the formation of variants with the floor assembly, the tunnel section is of multipart construction and has, with regard to the direction of travel, a front tunnel part and a rear tunnel part connected thereto. The rear tunnel part begins at the rear floor assembly end and ends at the front tunnel part which, for its part, ends at the front floor assembly end. The tunnel parts are fastened in each case directly or indirectly to the floor sections.

20 Claims, 2 Drawing Sheets

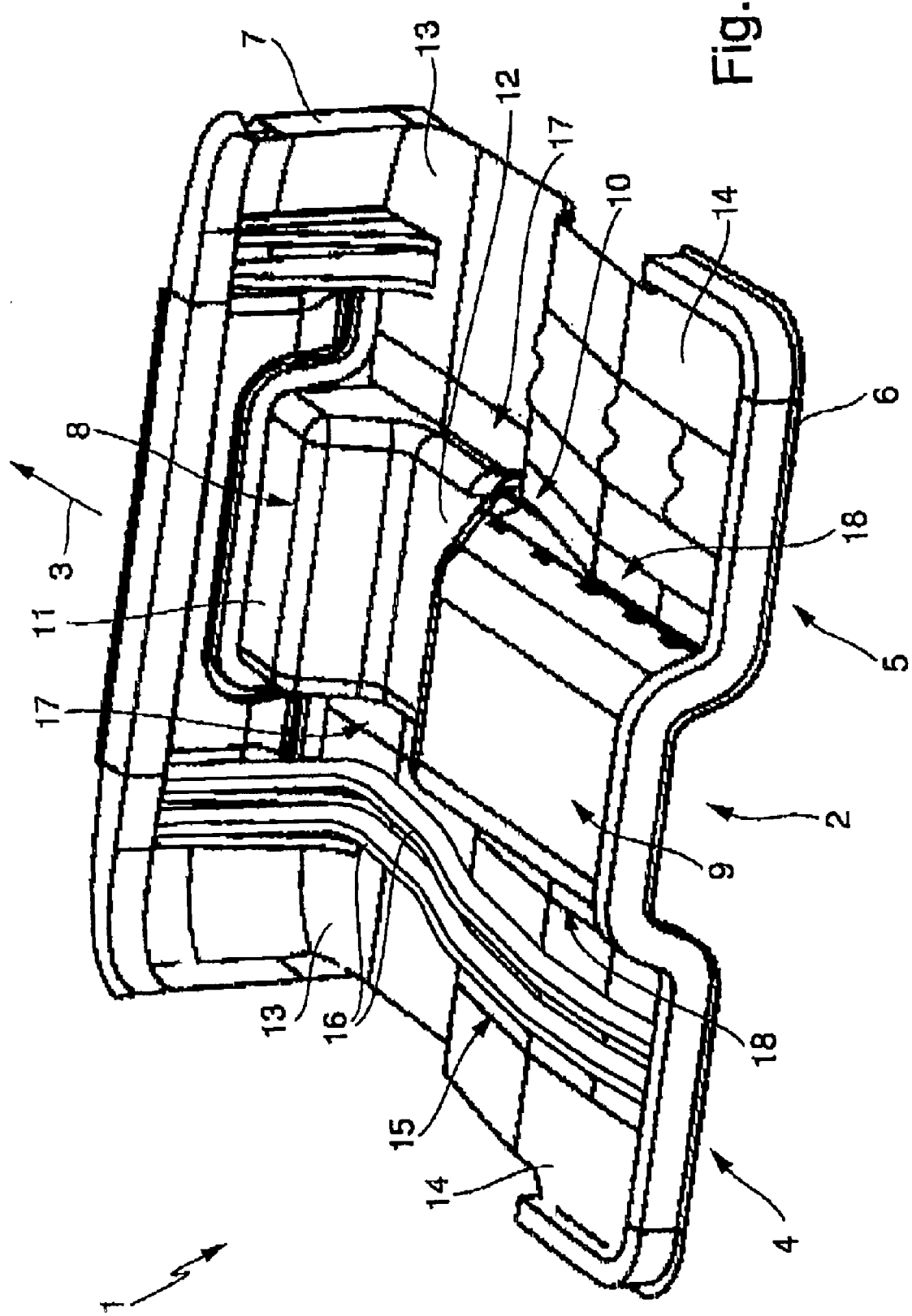

FLOOR ASSEMBLY FOR A DRIVER'S CAB AND METHOD OF MAKING

BACKGROUND AND SUMMARY OF THE INVENTION

This application claims the priority of German Patent Document 102 18 926.9, filed Apr. 27, 2002, the disclosure of which is expressly incorporated by reference herein.

The present invention relates to a floor assembly for a driver's cab of a commercial vehicle having a tunnel section extending in a direction of travel of the vehicle, a left floor section which extends on the left, with regard to a direction of travel, next to the tunnel section and is fastened laterally to the tunnel section, and a right floor section which extends on the right, with regard to the direction of travel, next to the tunnel section and is fastened laterally to the tunnel section, the tunnel section and the floor sections extending in the direction of travel from a common, rear floor assembly end as far as a common, front floor assembly end.

A floor assembly of this type is known from German Patent Document DE 198 02 092 A1 and comprises a tunnel section extending in the direction of travel of the vehicle, a left floor section which extends on the left, with regard to the direction of travel, next to the tunnel section and is fastened laterally to the tunnel section, and a right floor section which extends on the right, with regard to the direction of travel, next to the tunnel section and is fastened laterally to the tunnel section. The tunnel section and the two floor sections extend in the direction of travel from a common rear floor assembly end as far as a common front floor assembly end.

Different types of commercial vehicle require different embodiments for the floor assembly. For example, the floor assembly of a left-hand-drive vehicle can differ from the floor assembly of a right-hand-drive vehicle by the space needed for the pedals. The tunnel section has to protrude to a greater or lesser extent into the driver's cab depending on the motorization. Moreover, it may be required that the floor assembly has to line a heat exchanger of a cooling circuit of an internal combustion engine of the vehicle, which heat exchanger is arranged in the front region of the vehicle, with different configurations also being possible in the case of different variants of engine. Moreover, the driver's cab can differ in width in different types of vehicle, with the result that the floor assembly also has to be supplied with different widths. The outlay on the supply of a multiplicity of variants for the floor assembly is associated with high costs.

The present invention has an aspect concerned with the problem of specifying, for a floor assembly, an improved embodiment which, in particular, makes it easier to supply the correct floor assembly in each case for different types of vehicle.

This aspect may be solved according to certain preferred embodiments of the invention in that the tunnel section is of multipart construction and, with regard to the direction of travel, has a front tunnel part and a rear tunnel part connected thereto, the rear tunnel part beginning at the rear floor assembly end and ending at the front tunnel part which ends at the front floor assembly end, the front tunnel part and rear tunnel part being fastened in each case directly or indirectly to the floor sections. In addition, this aspect may be solved by a modular construction system for constructing a floor assembly as above, in that at least two different rear tunnel parts which differ from each other in respect to vertical height and have identical connecting sections for fastening to the floor sections or to rear attachment parts are provided.

Advantageous embodiments are contained in the dependent claims and herein below.

Certain preferred embodiments of the present invention are based on a concept of designing the tunnel section running between the two floor sections in a number of parts in such a manner that this tunnel section has at least one front tunnel part, with regard to the direction of travel, and a rear tunnel part connected thereto. This makes it possible to design this tunnel section with the aid of correspondingly designed tunnel parts as a function of the type of vehicle desired in each case. In addition, this manner of construction makes it possible to adapt individual regions of the tunnel section to the particular type of vehicle. This is of particular advantage, since different variants of engine, in particular, and variants of interior, above all, have an effect on the design of the tunnel section.

This makes it possible, by selecting individual parts of the tunnel section, to supply a number of variants for the tunnel section and hence for the floor assembly in a particularly simple manner. Since only individual parts have to be supplied in order to prepare different variants, the overall result is a reduced outlay for realizing different types of vehicle.

In a preferred embodiment, the front tunnel part can be fastened on at least one side to the respective floor section via a front attachment part. The same also applies for the rear tunnel part. With the aid of these attachment parts, the variability of the floor can additionally be increased, since the selection of different attachment parts and also the omission of attachment parts increase the freedom of design for the floor assembly.

In another embodiment, the rear tunnel part can extend above an internal combustion engine which, in the installed state of the floor assembly, is arranged below the driver's cab. In this embodiment, the floor assembly can be adapted in a particularly simple manner to variants of engine in which the internal combustion engine has different vertical measurements. In order to supply different types of floor assembly, it then suffices in each case to select the rear tunnel part so as to correspond while the front tunnel part can be used unchanged.

An embodiment is particularly expedient in which the rear tunnel part is designed as a removable tunnel cover. In the installed state, the internal combustion engine, which is arranged below the floor assembly, is then particularly readily accessible, which can be of advantage for certain maintenance measures. Moreover, the removable tunnel part simplifies the adaptation of the floor assembly to different variants of interior, since the tunnel part can be correspondingly adapted to the particular interior parts.

Further important features and advantages of the invention emerge from the subclaims, from the drawings and from the associated description of the figures with reference to the drawings.

It goes without saying that the features mentioned above and those which are yet to be explained below can be used not only in the respectively stated combination, but also in different combinations or on their own without departing from the scope of the present invention.

Preferred exemplary embodiments of the invention are illustrated in the drawings and will be explained in greater detail in the following description, in which identical reference numbers refer to identical or functionally identical or similar components.

Other objects, advantages and novel features of the present invention will become apparent from the following detailed description of the invention when considered in conjunction with the accompanying drawings.

BRIEF DESCRIPTION OF THE DRAWINGS

FIG. 1 shows a perspective view of a floor assembly according to the invention.

DETAILED DESCRIPTION OF THE DRAWINGS

Figure 3:
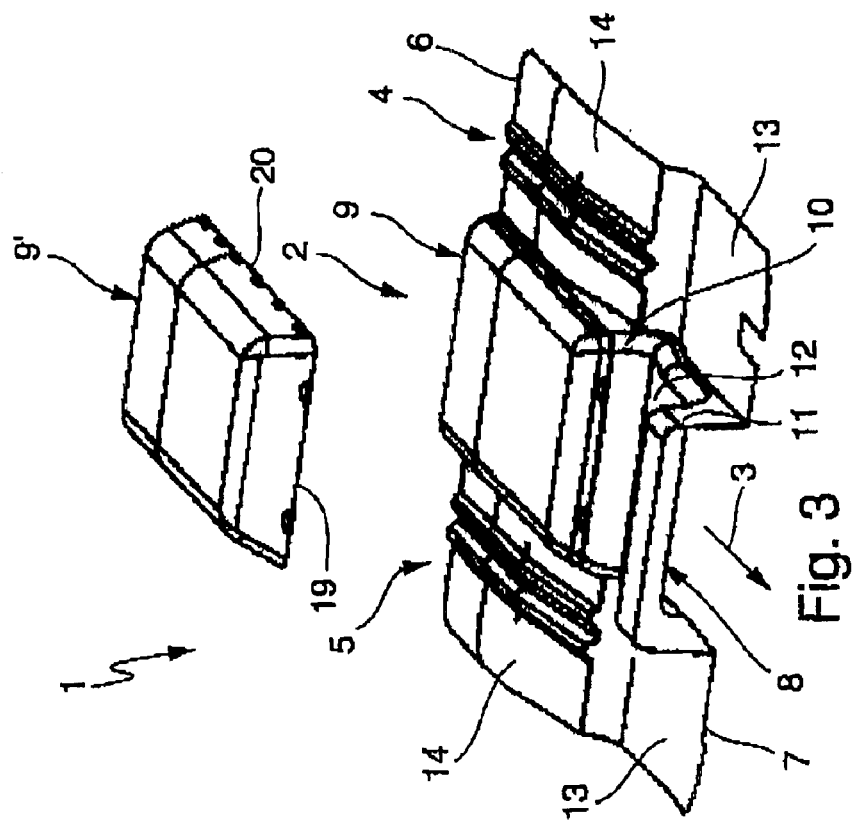
FIGS. 2 and 3 show views as in FIG. 1, but in the case of other embodiments, with, in addition, two different, rear tunnel parts which are optionally part of the floor assembly being illustrated in each case.
Figure 2:
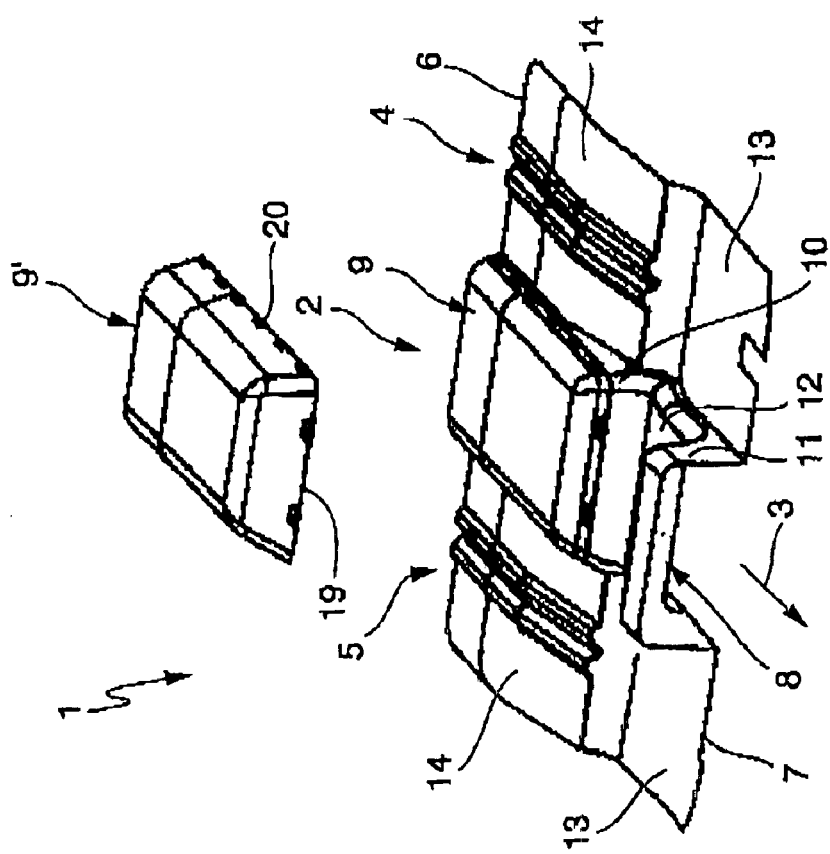

FIGS. 1 to 3 show a floor assembly 1, which, in the installed state in a commercial vehicle, closes off a driver's cab (not illustrated further) of the vehicle downwards. This floor assembly 1 has a tunnel section 2 which extends in a direction of travel 3 of the vehicle that is symbolized by an arrow. A left floor section 4 and a right floor section 5 are arranged on the left and right, with regard to the direction of travel 3, next to the tunnel section 2. The two floor sections 4 and 5 extend laterally along the tunnel section 2 and are fastened in each case to the tunnel section 2. In this case, the tunnel section 2 and the two floor sections 4, 5 emerge from a common, rear floor assembly end 6 and extend in the direction of travel 3 as far as a common, front floor assembly end 7.

The tunnel section 2 is of multipart construction and has at least one front tunnel part 8, with regard to the direction of travel 3, and a rear tunnel part 9, with regard to the direction of travel 3. The rear tunnel part 9 begins at the rear floor assembly end 6 and extends as far as a separating line extending transversely with respect to the direction of travel 3 and horizontally or as far as a connecting point 10, at which the rear tunnel part 9 is connected to the front tunnel part 8 or is fastened thereto. The front tunnel part 8 then extends from the rear tunnel part 9 as far as the front floor assembly end 7. Both the front tunnel part 8 and the rear tunnel part 9 are generally fastened in each case directly or indirectly to the two floor sections 4 and 5.

The front tunnel part 8 has, at a front end with regard to the direction of travel 3, an indentation 11 which protrudes into the driver's cab and which is adjoined to the rear by a region 12 which lies significantly lower than an upper side of this indentation 11. In the installed state of the floor assembly 1, the indentation 11 maybe used for covering a main heat exchanger (not shown here) of an engine cooling circuit which is arranged at the front end of the vehicle and is acted upon by the slipstream during the journey.

The two floor sections 4 and 5 each have a flooring region 13 forming the downward boundary of a footwell in the driver's cab. The two flooring regions 13 merge to the rear, with regard to the direction of travel 3, into seat regions 14 which are used for supporting a driver's seat or passenger's seat.

As can be gathered from the figures, the front tunnel part 8 extends basically along the above-mentioned flooring regions 13 while the rear tunnel part 9 extends at least along the seat regions 14.

In contrast to that of FIGS. 2 and 3, in the case of FIG. 1, the left floor section 4 is shown transparently in order to obtain a view of a supporting structure 15 having longitudinal members 16. The floor assembly 1 is supported with the aid of this supporting structure 15.

As shown in FIG. 1, the front tunnel part 8 and the rear tunnel part 9 are in each case fastened indirectly to the floor sections 4 and 5. For this purpose, front attachment parts 17 and rear attachment parts 18 are provided. The front attachment parts 17 are fastened on one side to the front tunnel part 8 and are fastened on the other side in each case to one of the floor sections 4, 5. In a corresponding manner, the rear attachment parts 18 are also fastened on one side to the rear tunnel part 9 and are fastened on the other side in each case to one of the floor sections 4, 5.

The selection of attachment parts 17, 18 of this type enables, for example, the entire width of the floor assembly 1 to differ in design. In particular, it is possible, by an asymmetrical fixing of the attachment parts 17, 18, to construct a larger footwell on one side of the driver's cab, in particular on the driver's side, than on the other side. This may be of advantage, for example for accommodating the pedals.

In the case of the embodiments of FIGS. 2 and 3, the front tunnel part 8 and the rear tunnel part 9 are in each case connected directly, i.e. without attachment parts 17, 18, to the floor sections 4, 5 or are fastened thereto. The two variants of FIGS. 2 and 3 differ by different widths of the tunnel sections 2 and of the floor sections 4 and 5, as measured transversely with respect to the direction of travel 3 and horizontally. In FIG. 2, the floor sections 4 and 5 are of significantly wider design than in the case of the variant according to FIG. 3. In contrast to this, in the case of the embodiment according to FIG. 3 the tunnel section 2 is of significantly wider design than in the design according to FIG. 2. However, in both embodiments the entire width of the floor assembly 1 is selected to be basically the same.

Accordingly, in both embodiments both the rear tunnel parts 9 and also the front tunnel parts 8 differ from one another in respect of their width. The wider variant is shown in FIG. 3. Since the entire width of the floor assembly 1 remains approximately the same, the widths of the floor sections 4 and 5 in the embodiments of FIGS. 2 and 3 are likewise selected such that they differ.

The width of the tunnel section 2 can be predetermined, for example, by the width of a main radiator, the upper end section of which protrudes into the indentation 11 of the front tunnel part 8 when the floor assembly 1 is fitted to the vehicle. The region 12 of the front tunnel part 8, which adjoins the indentation 11 and lies lower, increases the footwell of the driver's cab, since its surface lies approximately on the same level as the flooring regions 13 of the floor sections 4 and 5.

FIGS. 2 and 3 additionally show, above the fitted, rear tunnel parts 9, alternative embodiments of the rear tunnel parts 9' which can alternatively be fitted. In comparison with the fitted, rear tunnel parts 9, these additionally illustrated, alternative, rear tunnel parts 9' have a greater vertical height and can be used, for example, when the floor assembly 1 is required for a vehicle, the internal combustion engine of which has a greater vertical size.

As emerges particularly clearly from FIGS. 2 and 3, connecting zones 19 and 20, with which the rear tunnel part 9 or 9' is fastened or can be fastened to the front tunnel part 8 and to the floor sections 4, 5, are in each case relatively rectilinear. Moreover, these connecting zones 19, 20 lie in a connecting which extends basically horizontally. This manner of construction considerably simplifies the connection of the rear tunnel part 9, 9' to the remaining components 4, 5, 8, 18 of the floor assembly 1. In particular, this configuration of the connecting zones 19, 20 facilitates the design of the rear tunnel part 9 or 9' as a tunnel cover which is fastened removably to the remaining floor assembly 1, and permits access, for example for maintenance purposes, to the internal combustion engine arranged below it. Furthermore, the removable, rear tunnel part 9, 9' can be produced from a different material than the remaining components of the floor assembly 1, which makes different combinations of material possible.

In order to be able to construct a large number of different variants of floor assembly, a modular construction system is provided which expediently comprises a plurality of different rear tunnel parts 9, 9' and/or a plurality of different front tunnel parts 8 and/or a plurality of different floor sections 4 and 5. The individual components of the modular construction system can differ from one another, for example in respect of their vertical heights and/or in respect of their width, as measured transversely with respect to the direction of travel 3. Corresponding standardization of the intersections or connecting points enables the different components to be combined in various ways. The modular construction system expediently also comprises the attachment parts 17, 18 or a number of different embodiments of the attachment parts 17, 18. Standardization of the intersections or connecting points is also advantageous here in order to be able to use the attachment parts 17, 18 between the tunnel parts 8, 9 and the floor sections 4, 5, as the need arises, or in order to be able to omit them.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A floor assembly for a cab of a commercial vehicle, comprising:
    a tunnel section extending in a direction of travel of the vehicle,
    a left floor section which extends on the left, with regard to the direction of travel, next to the tunnel section and is fastened laterally to the tunnel section, and
    a right floor section which extends on the right, with regard to the direction of travel, next to the tunnel section and is fastened laterally to the tunnel section,
    wherein the left and right floor sections have flooring regions merging into seat regions adapted to support vehicle seats,
    wherein the tunnel section and the floor sections extend in the direction of travel from a common, rear floor assembly end as far as a common, front floor assembly end,
    wherein the tunnel section is of multipart construction and, with regard to the direction of travel, has a front tunnel part and a rear tunnel part connected thereto,
    wherein the rear tunnel part begins at the common rear floor assembly end and ends at the front tunnel part which ends at the front floor assembly end, and
    wherein the front tunnel part and the rear tunnel part are fastened in each case directly or indirectly to the floor sections.

2. The floor assembly according to claim 1, wherein the front tunnel part is fastened on at least one side to the respective floor section via a front attachment part.

3. The floor assembly according to claim 1, wherein the rear tunnel part is fastened on at least one side to the respective floor section via a rear attachment part.

4. The floor assembly according to claim 2, wherein the rear tunnel part is fastened on at least one side to the respective floor section via a rear attachment part.

5. The floor assembly according to claim 1, wherein the rear tunnel part extends above an internal combustion engine which, in an installed state of the floor assembly, is arranged below the cab.

6. The floor assembly according to claim 2, wherein the rear tunnel part extends above an internal combustion engine which, in an installed state of the floor assembly, is arranged below the cab.

7. The floor assembly according to claim 1, wherein the rear tunnel part is designed as a removable tunnel cover giving access to an internal combustion engine which, in an installed state of the floor assembly, is arranged below the cab.

8. The floor assembly according to claim 2, wherein the rear tunnel part is designed as a removable tunnel cover giving access to an internal combustion engine which, in an installed state of the floor assembly, is arranged below the cab.

9. The floor assembly according to claim 5, wherein the rear tunnel part is designed as a removable tunnel cover giving access to the internal combustion engine which, in an installed state of the floor assembly, is arranged below the cab.

10. The floor assembly according to claim 1, wherein connecting zones, with which the rear tunnel part is fastened to the front tunnel part and to rear attachment parts or to the floor sections, extend approximately in a connecting plane which extends approximately horizontally.

11. The floor assembly according to claim 3, wherein connecting zones, with which the rear tunnel part is fastened to the front tunnel part and to rear attachment parts or to the floor sections, extend approximately in a connecting plane which extends approximately horizontally.

12. The floor assembly according to claim 5, wherein connecting zones, with which the rear tunnel part is fastened to the front tunnel part and to rear attachment parts or to the floor sections, extend approximately in a connecting plane which extends approximately horizontally.

13. The floor assembly according to claim 1, wherein the front tunnel part extends approximately along the flooring regions.

14. The floor assembly according claim 10, wherein the front tunnel part extends approximately along the flooring regions.

15. A floor assembly for a cab of a commercial vehicle, comprising:
    a tunnel section extending in a direction of travel of the vehicle,
    a left floor section which extends on the left, with regard to the direction of travel, next to the tunnel section and is fastened laterally to the tunnel section, and
    a right floor section which extends on the right, with regard to the direction of travel, next to the tunnel section and is fastened laterally to the tunnel section,
    wherein the tunnel section and the floor sections extend in the direction of travel from a common, rear floor assembly end as far as a common, front floor assembly end,
    wherein the tunnel section is of multipart construction and, the regard to the direction of travel, has a front tunnel part and a rear tunnel part connected thereto,
    wherein the rear tunnel part begins at the common rear floor assembly end and ends at the front tunnel part which ends at the front floor assembly end, wherein the front tunnel part and the rear tunnel part are fastened in each case directly or indirectly to the floor sections, wherein the front tunnel part has, at a front end with regard to the direction of travel, an indentation which protrudes into the cab and, in an installed state of the floor assembly, covers a main heat exchanger of a cooling circuit of an internal combustion engine of the vehicle from above, and wherein a region of the front tunnel part, which said region adjoins the indentation to a rear, lies lower than an upper side of the indentation.

16. A modular construction system for constructing a floor assembly according to claim 1, comprising at least two different rear tunnel parts which differ from each other in respect to vertical height and have identical connecting sections for fastening to the floor sections or to rear attachment parts.

17. The modular construction system according claim 16, wherein at least two rear tunnel parts and two front tunnel parts are provided, the tunnel parts being tailored to different widths, as measured transversely with respect to the direction of travel.

18. The modular construction system according to claim 16, wherein at least two left floor sections or two right floor sections are provided, the floor sections being tailored to different widths, as measured transversely with respect to the direction of travel.

19. A method of making a floor assembly, comprising making the floor assembly of claim 1.

20. A method of using a floor assembly, comprising utilizing the floor assembly of claim 1.

* * * * *